(12) United States Patent
Yadav et al.

(10) Patent No.: US 11,244,525 B2
(45) Date of Patent: Feb. 8, 2022

(54) AUTHENTICATION SECURITY

(71) Applicant: International Business Machines Corporation, Armonk, NY (US)

(72) Inventors: Saurabh Yadav, Bangalore (IN); Raghuveer Prasad Nagar, Kota (IN); Arvind Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/805,948

(22) Filed: Mar. 2, 2020

(65) Prior Publication Data
US 2021/0272402 A1    Sep. 2, 2021

(51) Int. Cl.
| | | |
|---|---|---|
| G07C 9/20 | (2020.01) | |
| G06N 20/00 | (2019.01) | |
| G07C 9/27 | (2020.01) | |
| H04L 12/58 | (2006.01) | |

(52) U.S. Cl.
CPC ............ *G07C 9/215* (2020.01); *G06N 20/00* (2019.01); *G07C 9/27* (2020.01); *H04L 51/046* (2013.01)

(58) Field of Classification Search
CPC .................................................. G07C 9/215
USPC ........................................................ 235/380
See application file for complete search history.

(56) References Cited

U.S. PATENT DOCUMENTS

| 8,132,243 B2 | 3/2012 | Bychkov | |
|---|---|---|---|
| 2006/0080545 A1* | 4/2006 | Bagley | H04L 63/083 713/183 |
| 2015/0026786 A1* | 1/2015 | Alexander | H04W 12/128 726/7 |
| 2017/0093570 A1* | 3/2017 | Maruyama | H04L 9/006 |
| 2019/0156034 A1 | 5/2019 | Kedem et al. | |
| 2019/0279211 A1 | 9/2019 | Goyal et al. | |

FOREIGN PATENT DOCUMENTS

CN    102868668 A    1/2013

OTHER PUBLICATIONS

ET Online, "No, OTP is not surefire protection against online banking fraud", Oct. 16, 2018, 10 pages.
ET Bureau, "New form of OTP theft on rise, many techies victims", Updated: Jan. 14, 2019, 3 pages.
Kulat et al., "Prevention of Online Transaction Frauds Using OTP Generation Based on Dual Layer Security Mechanism", International Research Journal of Engineering and Technology (IRJET), vol. 03 Issue: 04| Apr. 2016, 3 pages.
Khan, "Preventing Phishing Attacks using One Time Password and User Machine Identification", International Journal of Computer Applications (0975-8887), vol. 68—No. 3, Apr. 2013, pp. 7-11.
Mell et al., "The NIST Definition of Cloud Computing", Recommendations of the National Institute of Standards and Technology, Sep. 2011, 7 pages.

* cited by examiner

*Primary Examiner* — Rafferty D Kelly
(74) *Attorney, Agent, or Firm* — Jamar K. Ray

(57) ABSTRACT

A method can include obtaining access code data corresponding to an access code transmitted to a user device. The method can further include monitoring the user device. The method can further include determining, based on the monitoring, that the access code is shared. The method can further include initiating, in response to the determining that the access code is shared, an invalidation of the access code.

16 Claims, 6 Drawing Sheets

AUTHENTICATION SECURITY

BACKGROUND

The present disclosure relates to security for transactions, and more specifically, to authentication security.

An entity, such as a company, government agency, or organization, can provide a resource, such as a website or a mobile application, by which a user can perform online transactions, such as banking and/or managing a user account. The entity can implement a security measure, such as an authentication process, to aid in verifying the user's identity prior to allowing an online transaction to be performed. One such authentication process can include the entity transmitting an access code to a user device and requesting that the user provide the access code to the entity.

SUMMARY

According to embodiments of the present disclosure, a method can include obtaining access code data corresponding to an access code transmitted to a user device. The method can further include monitoring the user device. The method can further include determining, based on the monitoring, that the access code is shared. The method can further include initiating, in response to the determining that the access code is shared, an invalidation of the access code.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
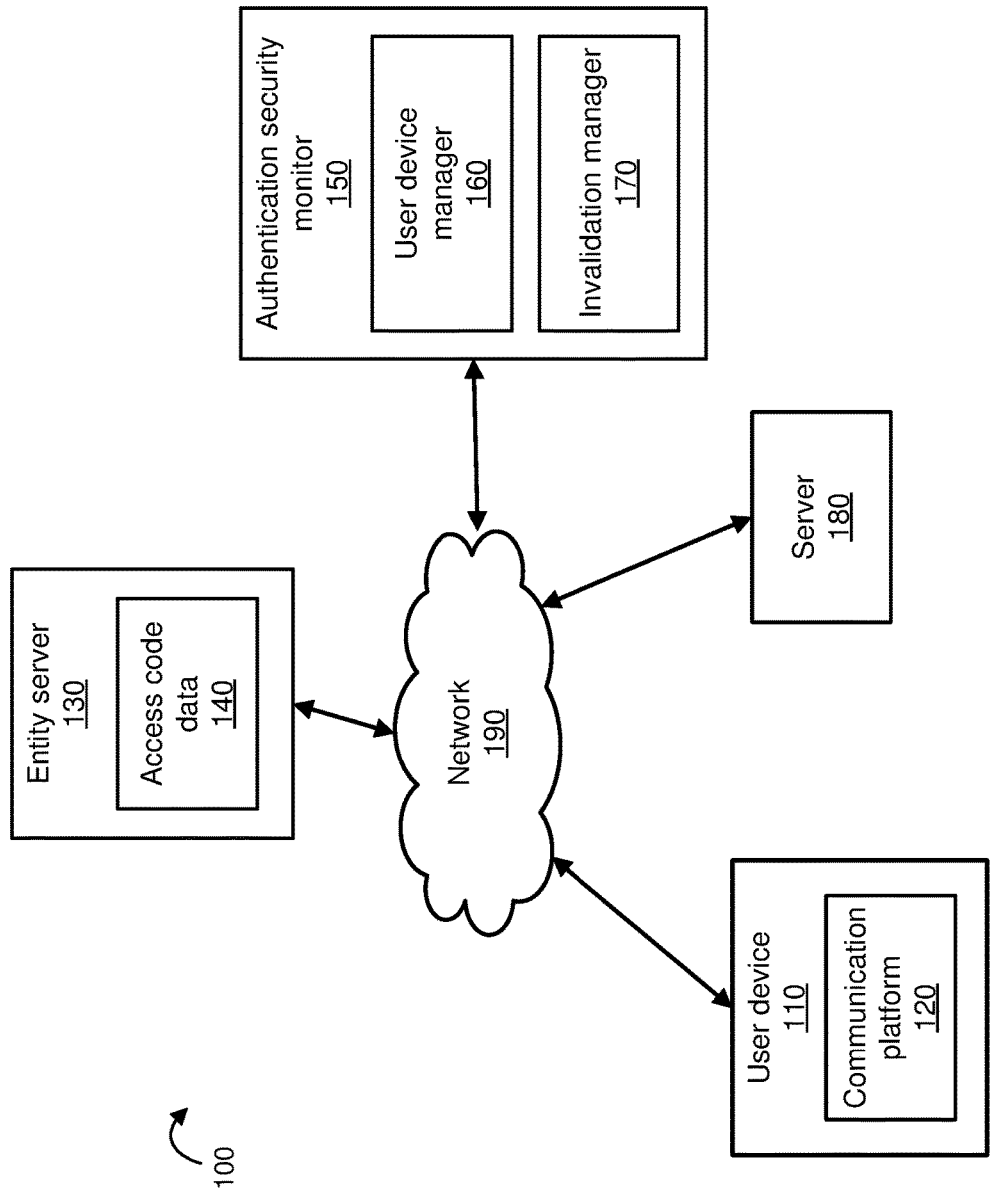
FIG. 1 depicts an example computing environment having an authentication security monitor, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to security of transactions; more particular aspects relate to authentication security. While the present disclosure is not necessarily limited to such applications, various aspects of the disclosure may be appreciated through a discussion of various examples using this context.

An entity, such as a company, government agency, or organization, can provide a resource, such as a website or a mobile application, by which a user can perform online transactions, such as banking, selecting services, and/or otherwise managing a user account. To reduce the potential for fraudulent transactions, the entity can implement one or more security measures that can aid in verifying the user's identity. Multi-factor authentication is an example of such a security measure. Multi-factor authentication can include the entity requesting two or more factors, or authentication items, prior to allowing a transaction to be performed.

For example, an entity can be a bank that provides a banking website through which a user can perform financial transactions. Before allowing the user to perform a financial transaction, the banking website can request that a first factor (e.g., a password) be submitted to the banking website. If the banking website receives a proper password, it can transmit a second, independent factor, such as an access code, to a user device, such as the user's mobile phone. Additionally, the banking website can request that the access code (e.g., a set of random alphanumeric characters) be submitted to the banking website. In some instances, the access code can have a validity period. The validity period can be a timeframe during which the access code can satisfy the banking website's request for the second factor. Thus, if the banking website receives the access code within the validity period, then the banking website can permit a user to perform the financial transaction. Otherwise, if the banking website does not receive the access code within the validity period, then the banking website can deny a user the ability to perform the financial transaction. By transmitting the access code to the user device and requesting that the access code be submitted within a validity period, the banking website can improve the likelihood that the person submitting the first factor and the person submitting the second factor are the same person. Furthermore, by requesting the first factor and the second factor, the banking website can improve the likelihood that the person submitting the first factor and the second factor is a valid user who is properly gaining access to the banking website to perform the financial transaction.

However, in some instances, a malicious actor, such as a hacker, can attempt to circumvent the multi-factor authentication to improperly perform a financial transaction. Continuing with the example discussed above, the hacker can obtain the user's password and contact information (e.g., phone number and/or e-mail address). The hacker can submit the password to the banking website in an attempt to perform a financial transaction. In response to receiving a proper password, the banking website can transmit an access code to the user's mobile phone. The hacker, aware that the banking website is configured to transmit the access code to the user, can call the user and attempt to persuade the user to share the access code (e.g., the hacker can pose as a bank employee and request that the user send the access code to the hacker, stating that the access code is needed to resolve an urgent matter). In this example, if the hacker is successful in retrieving the access code from the user, the hacker can submit it to the banking website and perform an improper financial transaction.

To address these and other challenges, embodiments of the present disclosure include an authentication security monitor. The authentication security monitor can monitor one or more user devices to determine whether an access code should be invalidated. More specifically, the authentication security monitor can automatically initiate an invalidation of an access code based on a determination that a user has shared the access code with an un-trusted contact. Accordingly, embodiments of the present disclosure can help reduce fraudulent transactions by enhancing security measures, such as multi-factor authentication.

Turning to the figures, FIG. 1 illustrates a computing environment 100 that includes one or more of each of an authentication security monitor 150, a user device 110, a server 180, an entity server 130, and a network 190. In some embodiments, at least one authentication security monitor 150, user device 110, server 180, and entity server 130 can exchange data with at least one other through the at least one network 190. One or more of each of the authentication security monitor 150, user device 110, server 180, entity server 130, and network 190 can include a computer system, such as the computer system 401 discussed with respect to FIG. 4.

In some embodiments, the authentication security monitor 150 can be a software application installed on a computer system of at least one of the user device 110, the entity server 130, and/or the server 180. The authentication security monitor 150 can include program instructions implemented by a processor, such as a processor of the user device 110, to perform one or more operations discussed with respect to FIG. 2. In some embodiments, the authentication security monitor 150 can include, modules, such as a user device manager 160 and an invalidation manager 170. In some embodiments, the user device manager 160 can include program instructions to perform operations 210-225, FIG. 2. In another example, in some embodiments, the invalidation manager 170 can include program instructions to perform operations 230-250, FIG. 2.

In some embodiments, the authentication security monitor 150 can be integrated into one or more software applications installed on the user device 110 (e.g., the authentication security monitor 150 can be included as a plug-in software component of a software application installed on the user device). In some embodiments, the authentication security monitor 150 can be configured to monitor one or more communication platforms 120 of the user device 110. A communication platform 120 can refer to at least one communication functionality of the user device 110. For example, a communication functionality can refer to voice communication (e.g., verbal communication between phones), electronic mail (e-mail) communication, and/or short message service ("SMS") communication of the user device. In some embodiments, SMS communication can include real time text communication, such as SMS chat.

In some embodiments, the authentication security monitor 150 can be a software application installed on an entity server 130 and/or a server 180; the software application can be implemented by a processor of the entity server 130 and/or the server 180. In some embodiments, the entity server 130 can be a server of a first entity, such as a company, government agency, or organization, and the server 180 can be a server of a distinct, second entity. In some embodiments, the entity server 130 and/or the server 180 can be configured to generate, store, and/or transmit access code data 140. Access code data 140 can include information such as an access code; a validity period corresponding to the access code; an indication (e.g., a message or annotation) that the access code has been transmitted to the user device 110; an indication that the access code has been received by the user device 110; and/or an indication of a communication platform by which the access code has been transmitted to and/or received by the user device 110. In some embodiments, access code data 140 can include metadata. An access code can refer to a set of characters and/or symbols. For example, in some instances, an access code can include a code such as a personal identification number (PIN), one-time password (OTP), or an access token.

In an example configuration, entity server 130 can be a web server for a banking company. Further in this example, the entity server 130 can be configured to provide a banking website that is accessible by the user device 110 through the network 190. Continuing with this example, the banking website can be configured to transmit an access code to the user device 110 during a multi-factor authentication process. Continuing with this example, the authentication security monitor 150 can be included in a software application installed on the user device 110. In some embodiments, the authentication security monitor 150 can be supported by a server 180 of a third-party company that offers an authentication security monitoring service. Alternatively, in some embodiments, the banking company can offer an authentication security monitoring service, and the authentication security monitor 150 can be supported by entity server 130. The authentication security monitor 150 can be configured to automatically initiate an invalidation of the access code as discussed below.

In some embodiments, the user device 110 can include a mobile phone, tablet, computer, smart watch, and the like. The user device 110 can include one or more communication platforms 120. In some embodiments, the network 190 can be a wide area network (WAN), a local area network (LAN), the Internet, or an intranet. In some embodiments, the network 190 can be substantially similar to, or the same as, cloud computing environment 50 discussed with respect to FIG. 5.

Figure 2:
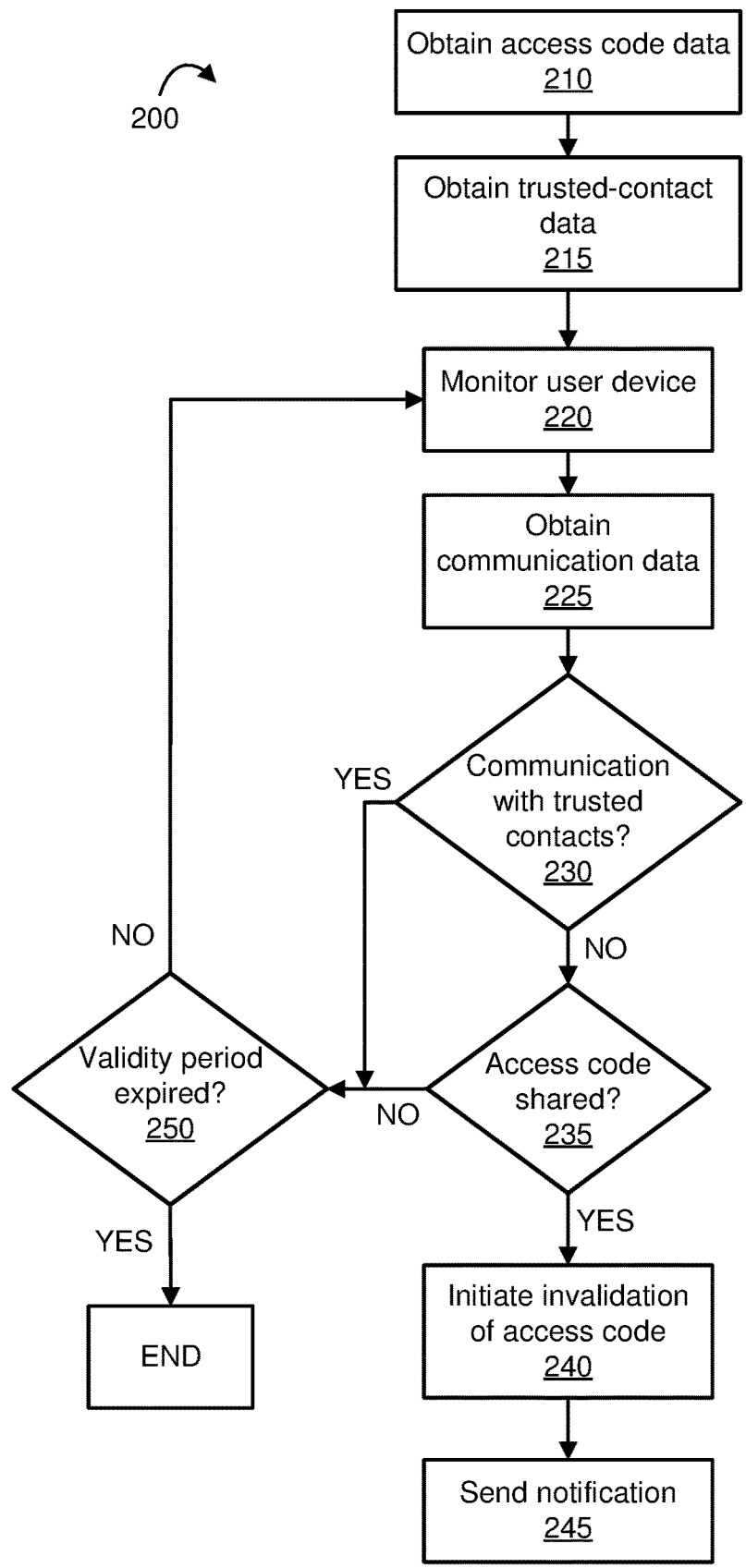
FIG. 2 depicts a flowchart of an example method for automatically initiating an invalidation of an access code, in accordance with embodiments of the present disclosure.

FIG. 2 illustrates a flowchart of an example method 200 for automatically initiating an invalidation of an access code, in accordance with embodiments of the present disclosure. The method 200 can be performed by an authentication security monitor, such as the authentication security monitor 150 described with respect to FIG. 1.

Referring back to FIG. 2, in operation 210, the authentication security monitor can obtain access code data. In some embodiments, the authentication security monitor can obtain access code data from a user device, such as user device 110 described with respect to FIG. 1. For example, in some embodiments, the authentication security monitor can obtain from the user device a SMS message containing an access code and a corresponding time of receipt of the SMS message. In some embodiments, the authentication security monitor can obtain from the user device an e-mail message containing an access code. In some embodiments, the authentication security monitor can obtain access code data from a server, such as entity server 130 described with respect to FIG. 1. For example, in some embodiments, the authentication security manager can obtain metadata from the entity server indicating that an access code was transmitted to a user device by SMS communication.

In operation 215, the authentication security monitor can obtain trusted-contact data. Trusted-contact data can include information corresponding to a trusted contact. A trusted contact can include one or more persons or entities deemed to have a low likelihood of misusing the access code (e.g., using the access code to perform a fraudulent transaction). Thus, the authentication security monitor can be configured to not initiate an invalidation of an access code in response to the access code being shared (e.g., transmitted by a verbal message or a text message, such as e-mail or SMS) with a trusted contact. In contrast, an un-trusted contact can include one or more persons or entities deemed to have a high likelihood of misusing the access code. Thus, the authentication security monitor can be configured to initiate an invalidation of the access code in response to the access code being shared with an un-trusted contact.

Trusted-contact data can include information such as names, phone numbers, e-mail addresses, and/or geographic locations corresponding to trusted contacts. In some embodiments, the authentication security monitor can obtain such trusted-contact data from a source such as a list and/or database of trusted-contact data generated by a user. In some embodiments, the authentication security monitor can obtain trusted-contact data from one or more sources such as an address book or contact list of a user device and/or a social media profile.

In operation 220, the authentication security monitor can monitor one or more user devices. Such monitoring can occur following a user's informed consent to the monitoring. In some embodiments, the authentication security monitor can initiate operation 220 in response to access code data obtained in operation 210, such as an indication that an access code was transmitted to a user device. In some embodiments, the authentication security monitor can limit the time frame for monitoring the one or more user devices such that the monitoring occurs within the validity period. In this way, in some embodiments, the authentication security monitor can monitor efficiently, as an access code shared outside of the validity period is unlikely to lead to a fraudulent transaction.

In some embodiments, operation 220 can include the authentication security monitor searching for information corresponding to a person or entity in communication with a monitored user device (e.g., information corresponding to a person or entity communicating with a user by transmitting and/or receiving text or verbal messages from the monitored user device). For example, in some embodiments, such searching can include accessing a resource, such as an internet database or a contact list, to identify a match between a phone number from which a user device received a phone call or text message and a phone number included in the resource. In some embodiments, monitoring one or more user devices can include analyzing content (e.g., text or verbal messages) of at least one communication platform (e.g., voice communication, e-mail communication, and/or SMS communication) of the one or more user devices. Such analyzing can include the authentication security monitor implementing technology such as natural language processing techniques and/or speech-to-text conversion techniques to interpret content of one or more communication platforms of a user device. For example, in some embodiments, the authentication security monitor can implement natural language processing techniques to interpret a degree of urgency with which a person in communication with a monitored user device requests an access code. For example, the authentication security monitor can interpret an SMS message request as urgent when the message includes characteristics such as all capital letters and/or time-sensitive language, such as "respond immediately."

By analyzing content of at least one communication platform of the one or more user devices, embodiments of the present disclosure can detect multiple ways in which an access code can be requested and/or shared. For example, in some embodiments, an un-trusted contact can call a user's mobile phone and request that the user share an access code by sending an SMS message. In some embodiments, an un-trusted contact can send an SMS chat message to a user's personal computer requesting that the user call a phone number and verbally share an access code. Thus, by analyzing content of at least one communication platform of one or more user devices, embodiments of the present disclosure can detect a plurality of messages that can potentially lead to fraudulent transactions.

In operation 225, based on the monitoring in operation 220, the authentication security monitor can obtain communication data. In some embodiments, communication data can include information obtained as a result of analyzing content of at least one communication platform in operation 220. Communication data can include information such as a name, e-mail address, phone number, and/or location corresponding to a person or entity in communication with a monitored user device; content of messages received by and/or transmitted from a monitored user device; and/or times (e.g., timestamps) corresponding to messages received by and/or transmitted from a monitored user device. In some embodiments, communication data can include an identification of a communication platform by which an access code is shared with a person and/or entity in communication with a monitored user device. In some embodiments, communication data can include information such as a classification (e.g., urgent or non-urgent) of a message received by a monitored user device. In some embodiments, a message can be considered received by a user device when it is stored on, audible on, and/or displayable on the user device.

In operation 230, the authentication security monitor can determine whether a person or entity in communication with a monitored user device is a trusted contact. For example, in some embodiments, operation 230 can include the authentication security monitor comparing trusted-contact data obtained in operation 215 to communication data obtained in operation 225 and determining whether one or more matches exist. For example, operation 230 can include the authentication security monitor determining that an entity in communication with a monitored user device is an un-trusted contact based on a name and phone number corresponding to the entity not matching a name and phone number corresponding to a trusted contact. If the authentication security monitor determines that a person or entity in communication with the monitored user device is a trusted contact, the authentication security monitor can proceed to operation 250. Alternatively, if the authentication security monitor determines that a person or entity in communication with the monitored user device is an un-trusted contact, the authentication security monitor can proceed to operation 235.

In operation 235, the authentication security monitor can determine whether an access code is shared. In some embodiments, the authentication security monitor can determine that an access code is shared when an access code obtained in operation 210 matches an access code obtained in operation 225. For example, in some embodiments, operation 235 can include the authentication security monitor comparing an access code obtained from an entity server to an access code obtained as a result of an analysis of verbal messages transmitted from a user device. In this example, if the authentication security monitor determines that the access codes match, the authentication security monitor can determine that the access code is shared.

In response to determining that an access code is shared, the authentication security monitor can proceed to operation 240. In response to determining that an access code is not shared, the authentication security monitor can proceed to operation 250.

In some embodiments, operation 235 can further include the authentication security monitor comparing a validity period to times (e.g., timestamps) corresponding to messages transmitted from a user device. In these embodiments, the authentication security monitor can determine whether a message including an access code was transmitted from the user device within the validity period. In these embodiments, in response to determining that a message including an access code was transmitted from the user device within the validity period, the authentication security monitor can proceed to operation 240. Otherwise, in response to determining that a message including an access code was transmitted from the user device outside of the validity period, the authentication security monitor can proceed to operation 250.

In operation 240, the authentication security monitor can initiate an invalidation of an access code. In some embodiments, initiating an invalidation of an access code can include the authentication security monitor issuing a command to nullify an access code such that the access code cannot satisfy an authentication request. In some embodiments, such a command can be received by a server, such as an entity server, which can invalidate the access code in response to receiving the command. In some embodiments, operation 240 can include the authentication security monitor invalidating, or nullifying, an access code.

In response to operation 240, in some embodiments, the authentication security monitor can proceed to operation 245. In operation 245, the authentication security monitor can send one or more notifications regarding an invalidation of the access code. The one or more notifications can be sent to one or more user devices and/or one or more servers. In this way, the authentication security monitor can alert one or more persons and/or entities of a potential fraudulent transaction attempt. In response, the one or more persons and/or entities can implement additional precautions and/or security measures to prevent a future fraudulent transaction.

In operation 250, the authentication security monitor can determine whether a validity period has expired. For example, in some embodiments a validity period can be a timeframe of 10 minutes. Further in this example, the authentication security monitor can obtain a time of receipt of an access code in operation 210. Further in this example, the authentication security monitor can obtain a current time from at least one of a server or a user device. Accordingly, in this example, the authentication security manager can determine whether an elapsed time between the time of receipt of the access code and the current time exceeds the validity period of 10 minutes. In some embodiments, if an elapsed time between the time of receipt of the access code and the current time exceeds the validity period, the authentication security monitor can determine that the validity period has expired and method 200 can end. Otherwise, in some embodiments, if an elapsed time between the time of receipt of the access code and the current time does not exceed the validity period, the authentication security monitor can determine that the validity period has not expired and the authentication security monitor can proceed to operation 220 to continue monitoring the user device.

Figure 3:
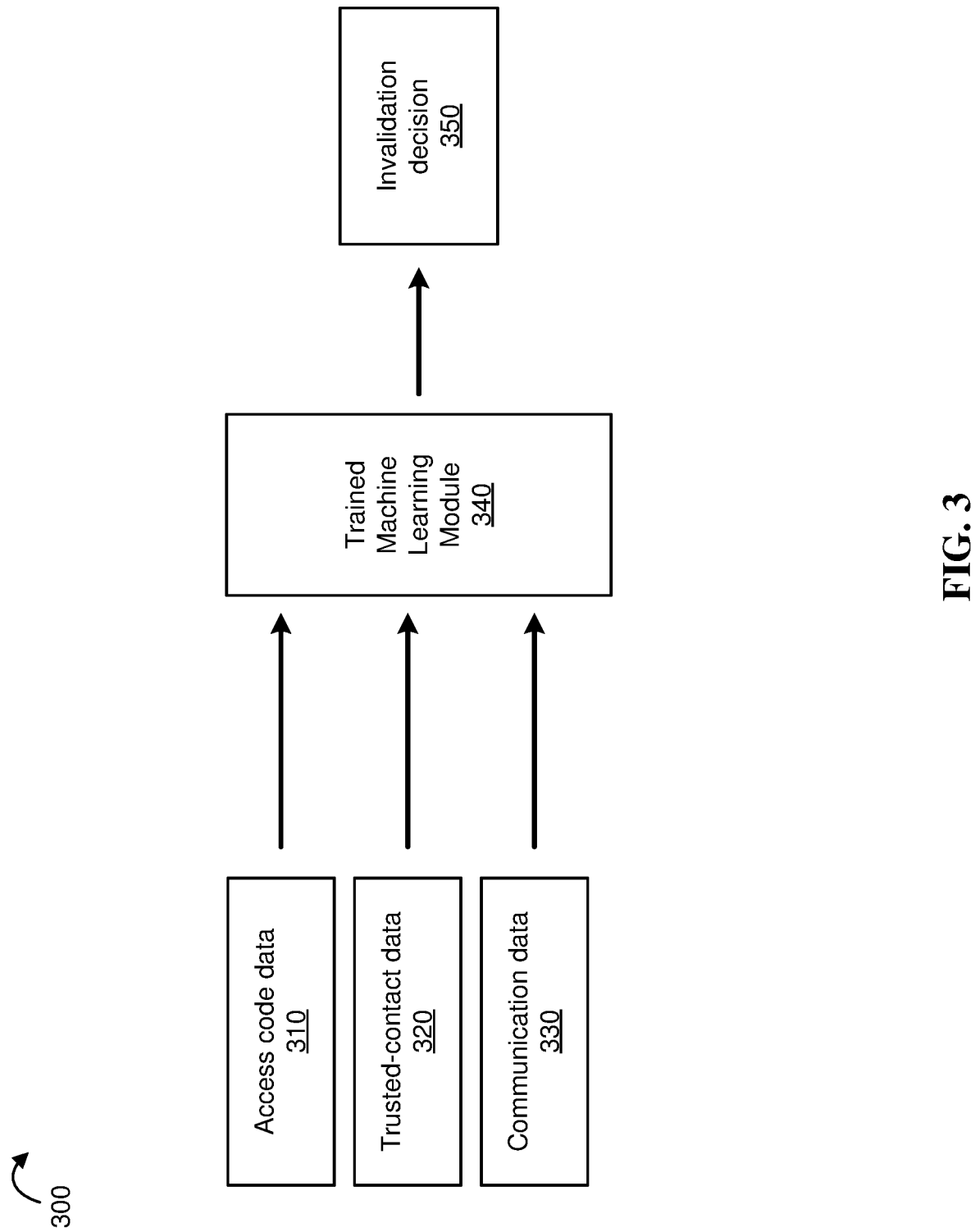
FIG. 3 depicts an example system block diagram of a trained machine learning module, in accordance with embodiments of the present disclosure.

FIG. 3 depicts an example system block diagram 300 of a trained machine learning module that can be included in an authentication security monitor in accordance with embodiments of the present disclosure. System block diagram 300 includes example data that can be transmitted to a trained machine learning module 340. In some embodiments, the trained machine learning module 340 can be a processor that includes a machine learning algorithm. The machine learning algorithm can be generated by performing supervised, unsupervised, or semi-supervised training on a dataset. The generated algorithm can be applied to predict an appropriate invalidation decision 350. In some embodiments, the invalidation decision 350 can include a label such as, "invalidate access code" or "do not invalidate access code." In some embodiments, the authentication security system can obtain user feedback that can be used to train the machine learning module.

As discussed above, access code data 310 can include information such as an access code; a validity period corresponding to the access code; an indication (e.g., a message or annotation) that the access code has been transmitted to a user device; an indication that the access code has been received by a user device; and/or an indication of a communication platform by which the access code has been transmitted to and/or received by a user device. Also, as discussed above, trusted-contact data 320 can include information such as names, phone numbers, e-mail addresses, and/or geographic locations corresponding to trusted contacts. Additionally, as discussed above, communication data 330 can include information such as a name, e-mail address, phone number, and/or location corresponding to a person or entity in communication with a monitored user device; content of messages received by and/or transmitted from a monitored user device; times (e.g., timestamps) corresponding to messages received by and/or transmitted from a monitored user device; an identification of a communication platform by which an access code is shared with a person and/or entity in communication with a monitored user device; and/or a classification (e.g., urgent or non-urgent) of a message received by a monitored user device.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 4:
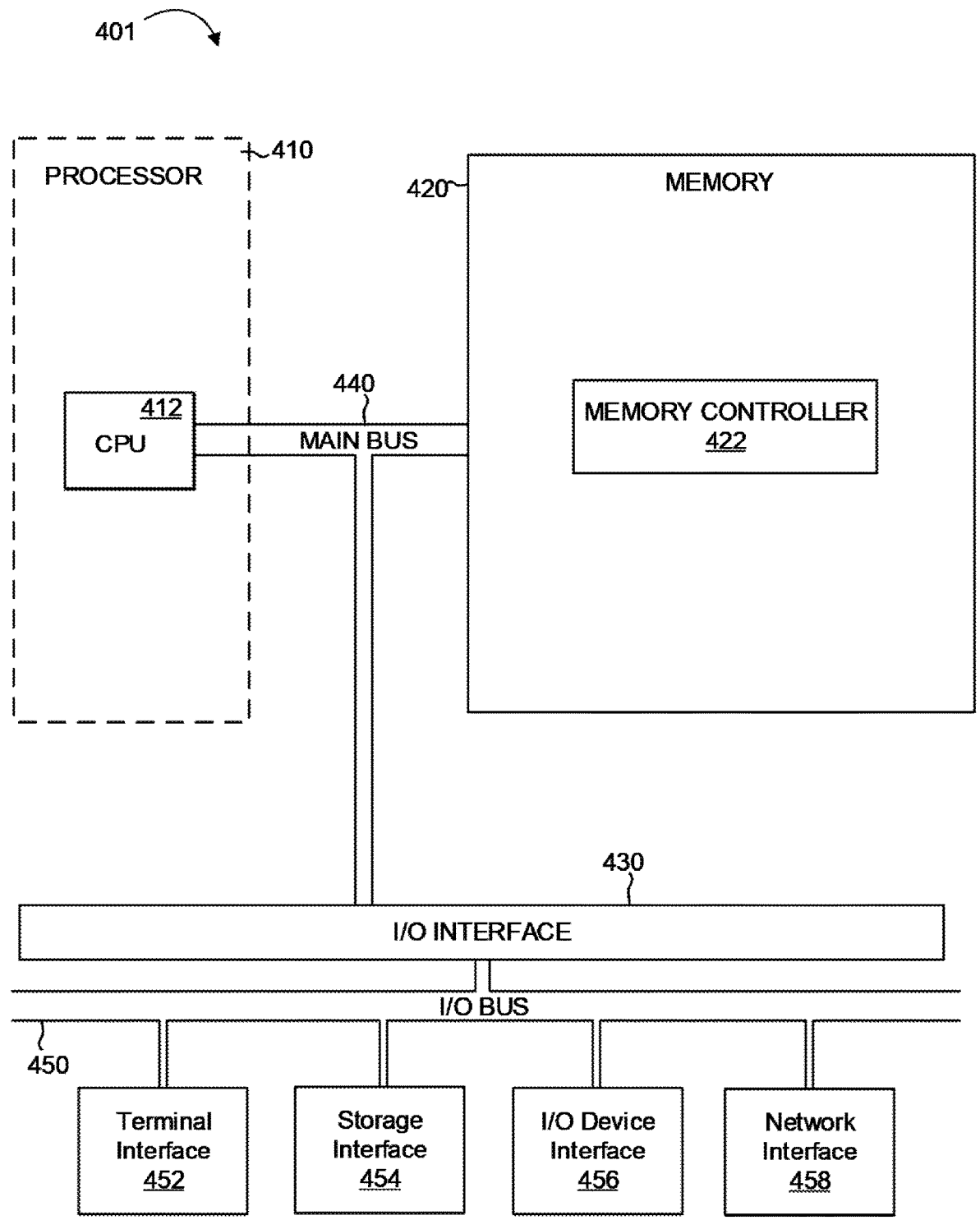
FIG. 4 depicts the representative major components of a computer system that can be used in accordance with embodiments of the present disclosure.

FIG. 4 depicts the representative major components of an exemplary Computer System 401 that can be used in accordance with embodiments of the present disclosure. The particular components depicted are presented for the purpose of example only and are not necessarily the only such variations. The Computer System 401 can comprise a Processor 410, Memory 420, an Input/Output Interface (also referred to herein as I/O or I/O Interface) 430, and a Main Bus 440. The Main Bus 440 can provide communication pathways for the other components of the Computer System 401. In some embodiments, the Main Bus 440 can connect to other components such as a specialized digital signal processor (not depicted).

The Processor 410 of the Computer System 401 can be comprised of one or more CPUs 412. The Processor 410 can additionally be comprised of one or more memory buffers or caches (not depicted) that provide temporary storage of instructions and data for the CPU 412. The CPU 412 can perform instructions on input provided from the caches or from the Memory 420 and output the result to caches or the Memory 420. The CPU 412 can be comprised of one or more circuits configured to perform one or methods consistent with embodiments of the present disclosure. In some embodiments, the Computer System 401 can contain multiple Processors 410 typical of a relatively large system. In other embodiments, however, the Computer System 401 can be a single processor with a singular CPU 412.

The Memory 420 of the Computer System 401 can be comprised of a Memory Controller 422 and one or more memory modules for temporarily or permanently storing data (not depicted). In some embodiments, the Memory 420 can comprise a random-access semiconductor memory, storage device, or storage medium (either volatile or non-volatile) for storing data and programs. The Memory Controller 422 can communicate with the Processor 410, facilitating storage and retrieval of information in the memory modules. The Memory Controller 422 can communicate with the I/O Interface 430, facilitating storage and retrieval of input or output in the memory modules. In some embodiments, the memory modules can be dual in-line memory modules.

The I/O Interface 430 can comprise an I/O Bus 450, a Terminal Interface 452, a Storage Interface 454, an I/O Device Interface 456, and a Network Interface 458. The I/O Interface 430 can connect the Main Bus 440 to the I/O Bus 450. The I/O Interface 430 can direct instructions and data from the Processor 410 and Memory 420 to the various interfaces of the I/O Bus 450. The I/O Interface 430 can also direct instructions and data from the various interfaces of the I/O Bus 450 to the Processor 410 and Memory 420. The various interfaces can comprise the Terminal Interface 452, the Storage Interface 454, the I/O Device Interface 456, and the Network Interface 458. In some embodiments, the various interfaces can comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—can communicate failures and changes to one or more components to a hypervisor or operating system (not depicted). The hypervisor or the operating system can allocate the various resources available in the Computer System 401 and track the location of data in Memory 420 and of processes assigned to various CPUs 412. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
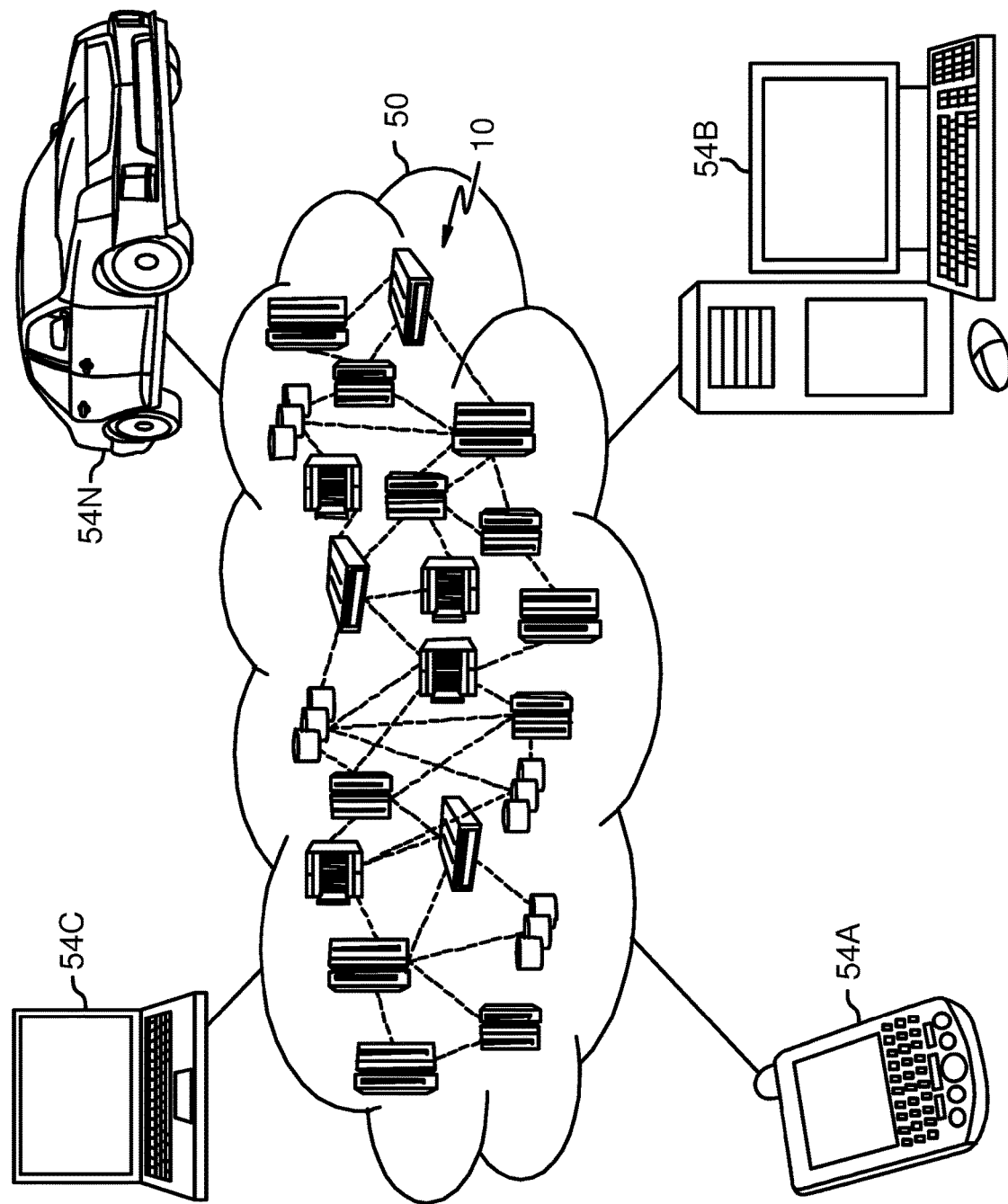
FIG. 5 depicts a cloud computing environment according to embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
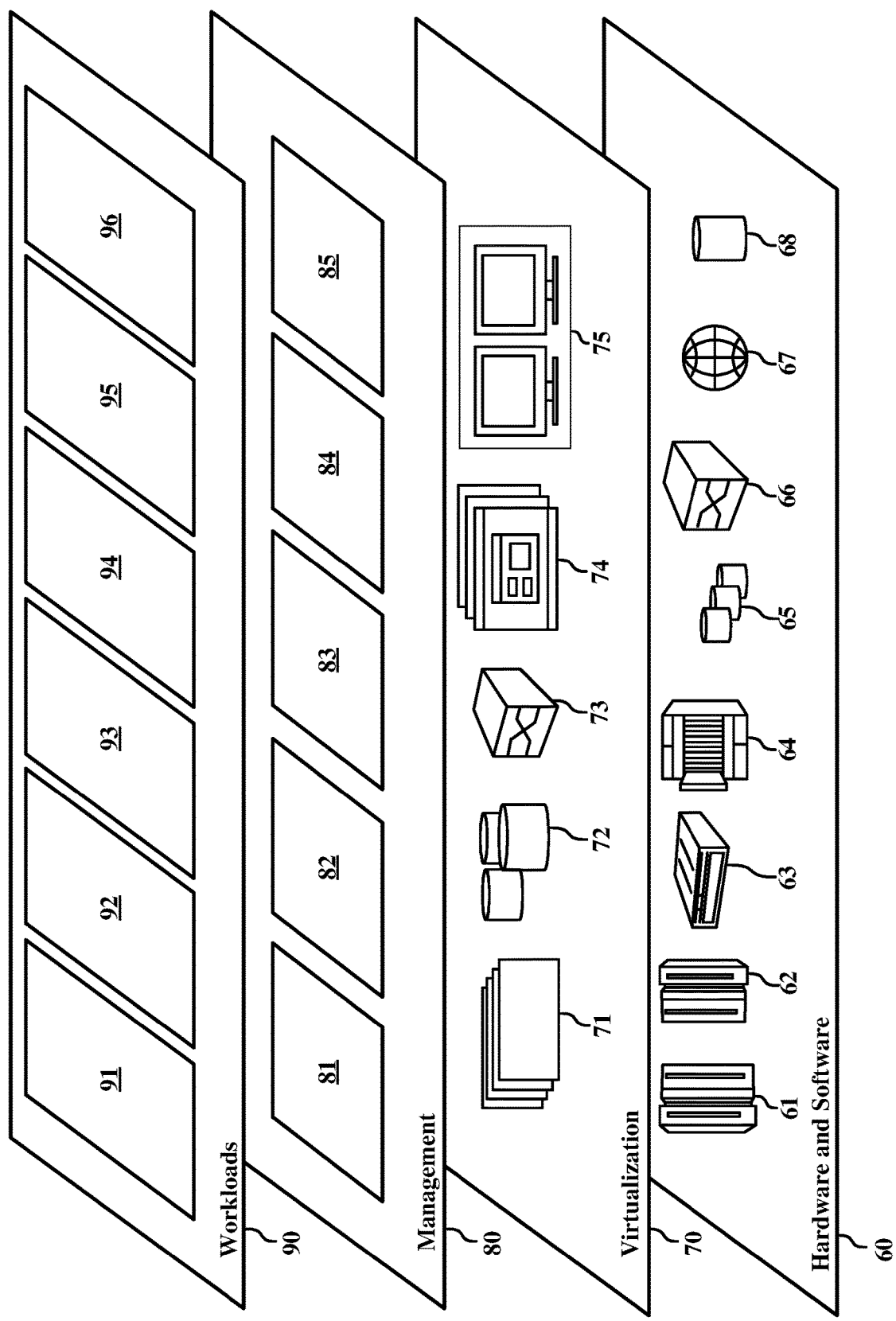
FIG. 6 depicts abstraction model layers according to embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and authentication security logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, from a first entity, access code data corresponding to an access code transmitted to a user device from the first entity;
monitoring the user device in response to the obtaining the access code data;
obtaining, based on the monitoring, an indication of communication between the user device and a second entity, the second entity different from the first entity;
determining, based on the monitoring, that the second entity is an un-trusted contact;
determining, in response to the determining that the second entity is the un-trusted contact, that the access code is shared, by the user device, with the un-trusted contact; and
initiating, in response to the determining that the access code is shared with the un-trusted contact, an invalidation of the access code.

2. The computer-implemented method of claim 1, wherein the access code data includes a validity period, the validity period comprising a predetermined time period during which the access code data is valid; and
wherein the monitoring occurs within the validity period.

3. The computer-implemented method of claim 2, wherein the determining that the access code is shared with the un-trusted contact includes determining that the access code is shared with the un-trusted contact within the validity period.

4. The computer-implemented method of claim 1, wherein the access code data includes a first indication that the access code was transmitted to the user device; and
wherein the monitoring occurs in response to obtaining the first indication.

5. The computer-implemented method of claim 1, wherein the access code data includes a second indication that the access code was received by the user device; and
wherein the monitoring occurs in response to obtaining the second indication.

6. The computer-implemented method of claim 1, wherein the monitoring includes analyzing content of at least one communication platform of the user device, wherein the at least one communication platform is selected from a group consisting of: voice communication, electronic mail communication, and short message service communication.

7. The computer-implemented method of claim 6, wherein the access code data includes a third indication that the access code was received by the user device by a first communication platform of the user device, wherein the first communication platform is selected from a group consisting of: electronic mail communication and short message service communication;
wherein the determining that the access code is shared with the un-trusted contact comprises determining that the access code is shared by a second communication platform of the user device, wherein the second communication platform is selected from a group consisting of: voice communication, electronic mail communication, and short message service communication; and
wherein the first communication platform is different from the second communication platform.

8. The computer-implemented method of claim 6, wherein the access code data includes a fourth indication that the access code was transmitted to the user device by short message service communication; and
wherein the determining that the access code is shared with the un-trusted contact comprises determining that the access code is shared by voice communication.

9. A system comprising:
a processor; and
a memory in communication with the processor, the memory containing program instructions that, when executed by the processor, are configured to cause the processor to perform a method, the method comprising:
obtaining, from a first entity, access code data corresponding to an access code transmitted to a user device from the first entity, the access code data including a first indication that the access code was transmitted from the first entity to the user device;
obtaining trusted-contact data corresponding to the user device;
monitoring the user device in response to the obtaining the first indication;
obtaining, based on the monitoring, communication data indicating communication between the user device and a second entity, the second entity different from the first entity;
determining, by comparing the trusted-contact data to the communication data, that the second entity is an un-trusted contact;
determining, in response to the determining that the second entity is the un-trusted contact, that the access code is shared, by the user device, with the un-trusted contact; and
initiating, in response to the determining that the access code is shared with the un-trusted contact, an invalidation of the access code.

10. The system of claim 9, wherein the access code data includes a validity period; and
wherein the monitoring occurs within the validity period.

11. The system of claim 10, wherein the determining that the access code is shared with the un-trusted contact includes determining that the access code is shared within the validity period.

12. The system of claim 9, wherein the access code data includes a second indication that the access code was received by the user device; and
wherein the monitoring occurs in response to obtaining the second indication.

13. The system of claim 9, wherein the monitoring includes analyzing content of at least one communication platform of the user device, wherein the at least one communication platform is selected from a group consisting of: voice communication, electronic mail communication, and short message service communication.

14. The system of claim 9, wherein the determining that the second entity is an un-trusted contact comprises determining that the communication data does not match the trusted-contact data.

15. A computer program product comprising a computer readable storage medium having program instructions embodied therewith, the program instructions executable by a processor to cause the processor to perform a method, the method comprising:
obtaining trusted contact data corresponding to a set of trusted contacts;
obtaining access code data comprising a first indication that an access code was transmitted to a user device the access code data including a validity period;
monitoring the user device in response to the obtaining the access code data, the monitoring comprising analyzing content of at least one communication platform of the user device, the at least one communication platform selected from a group consisting of: voice communication, electronic mail communication, and short message service communication, the monitoring occurring within the validity period;

obtaining, based on the monitoring, communication data corresponding to a contact in communication with the user device;

determining, by comparing the trusted contact data to the communication data, that the contact is an un-trusted contact;

determining, based on the monitoring, that the access code is shared, by the user device, with the un-trusted contact, wherein the determining that the access code is shared with the un-trusted contact includes determining that the access code is shared within the validity period; and initiating, in response to the determining that the access code is shared with the un-trusted contact, an invalidation of the access code.

16. The computer program product of claim 15, wherein the access code data includes a second indication that the access code was received by the user device; and wherein the monitoring occurs in response to obtaining the second indication.

* * * * *